(12) United States Patent
Callaway et al.

(10) Patent No.: US 9,096,989 B2
(45) Date of Patent: Aug. 4, 2015

(54) ON DEMAND DISPLACEMENT CONTROL OF HYDRAULIC POWER SYSTEM

(75) Inventors: Joshua Callaway, Cary, NC (US); Christopher Elliott, Apex, NC (US); Grant Peterson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 547 days.

(21) Appl. No.: 13/481,458

(22) Filed: May 25, 2012

(65) Prior Publication Data

US 2013/0312397 A1 Nov. 28, 2013

(51) Int. Cl.
*F16H 61/4017* (2010.01)
*E02F 9/22* (2006.01)
*F16H 61/431* (2010.01)

(52) U.S. Cl.
CPC ............ *E02F 9/2235* (2013.01); *E02F 9/2253* (2013.01); *E02F 9/2289* (2013.01); *E02F 9/2292* (2013.01); *E02F 9/2296* (2013.01); *F16H 61/4017* (2013.01); *F16H 61/431* (2013.01)

(58) Field of Classification Search
CPC .. F16H 61/4017; F16H 61/431; E02F 9/2235; E02F 9/2289; E02F 9/2253; E02F 9/2296
USPC .................... 60/329, 445, 448, 452, 490, 494
See application file for complete search history.

(56) References Cited

U.S. PATENT DOCUMENTS

| | | | | |
|---|---|---|---|---|
| 4,341,133 | A * | 7/1982 | Sakamoto | 60/490 |
| 5,390,759 | A * | 2/1995 | Gollner | 180/307 |
| 5,941,689 | A * | 8/1999 | Skirde | 417/32 |
| 6,202,411 | B1 | 3/2001 | Yamashita | |
| 7,392,653 | B2 | 7/2008 | Sugano | |
| 7,926,267 | B2 * | 4/2011 | Koehler et al. | 60/445 |
| 8,286,748 | B2 * | 10/2012 | Takahashi et al. | 180/307 |
| 8,327,638 | B2 * | 12/2012 | Ohtsukasa | 60/445 |
| 8,356,479 | B2 * | 1/2013 | Essig | 60/490 |
| 8,668,042 | B2 * | 3/2014 | Elliott | 180/339 |

* cited by examiner

*Primary Examiner* — Thomas E Lazo
(74) *Attorney, Agent, or Firm* — Leydig, Voit & Mayer, Ltd.

(57) ABSTRACT

A method and apparatus for controlling a hydraulic power system is provided that includes a hydraulic motor and a hydraulic pump configured to supply hydraulic fluid to the hydraulic motor. A relief valve is provided that is configured to release hydraulic fluid from a location between the hydraulic pump and the hydraulic motor when a pressure of the hydraulic fluid exceeds a predetermined relief pressure. Above a predetermined threshold pressure for the system, the displacement of the pump is adjusted to at least a minimum displacement that is based on a total demanded flow for the system that includes a desired flow of hydraulic fluid across the relief valve and a first hydraulic fluid flow consumed by the motor.

20 Claims, 4 Drawing Sheets

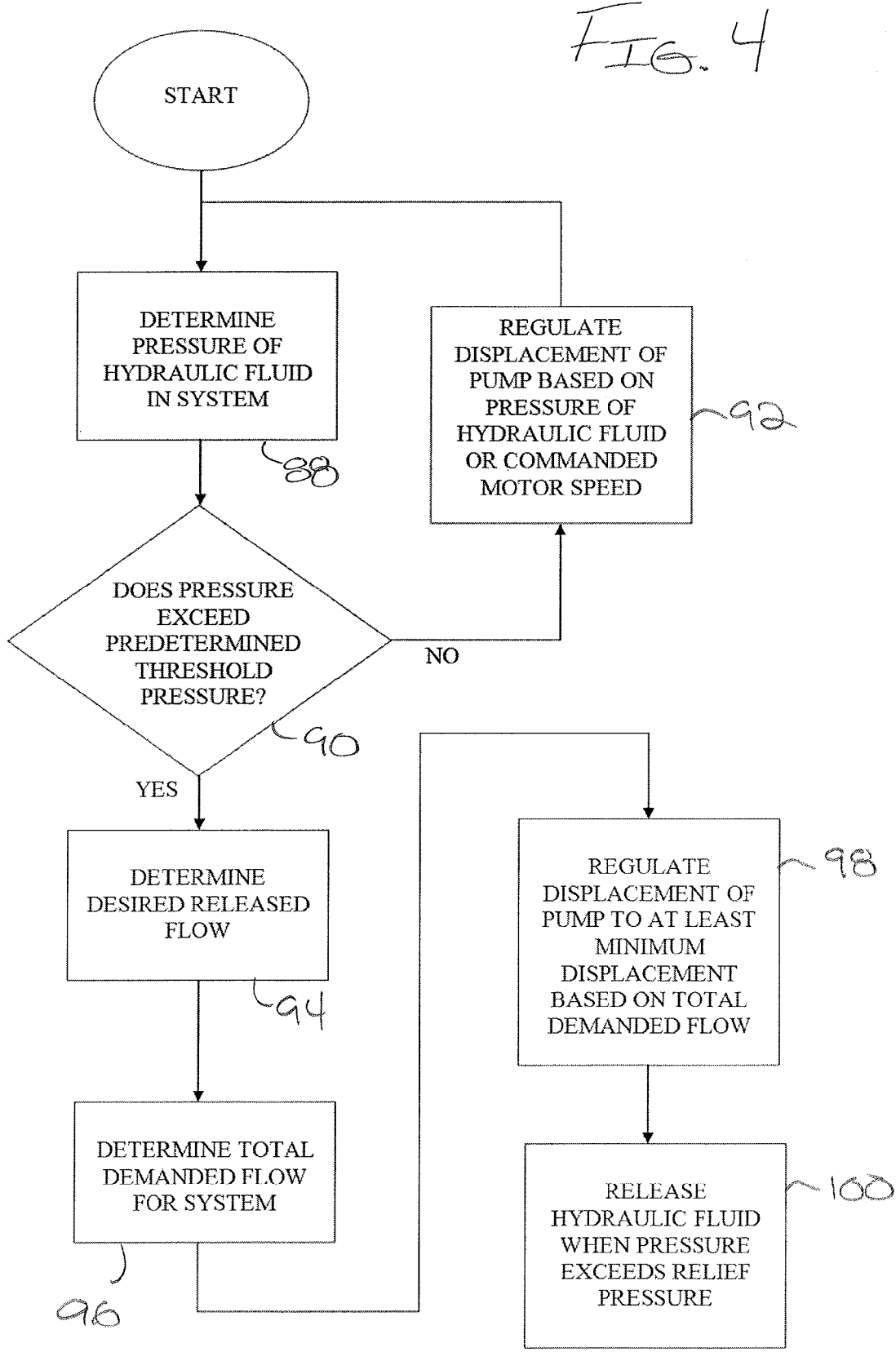

US 9,096,989 B2

ON DEMAND DISPLACEMENT CONTROL OF HYDRAULIC POWER SYSTEM

TECHNICAL FIELD

This patent disclosure relates generally to hydraulic power control systems and methods and, more particularly to systems and methods of controlling displacement of hydraulic pumps of hydraulic power systems based on demanded total system flow.

BACKGROUND

Machines may include one or more hydraulic power systems to drive one or more loads. The load may be a work implement on the machine or it may be a drive component that provides propulsion for the machine itself. For example, in a machine drive train, a hydraulic power system, also known as a hydrostatic transmission, may be used in lieu of a mechanical transmission.

A hydraulic power system may include a variable displacement hydraulic pump and a hydraulic motor, which may also have variable displacement, that are connected together in a closed loop configuration. Fluid pumping through the hydraulic motor can cause it to spin an output shaft to thereby move a load such as a drive mechanism, such as a wheel or track, or a work implement. By varying the displacement of the pump, the amount of fluid pumped to the hydraulic motor may be controlled. This can be in response to a received operator input. For example, when an operator depresses an accelerator pedal to indicate a desire for more speed or torque of a drive mechanism, a discharge of the pump (flow and/or pressure) is proportionally increased.

To protect components of the transmission from damage, operation of the pump and/or motor is commonly limited according to pressure. Pressure may build in a hydraulic power system that functions to power the drive mechanism of a machine when the machine encounters an external resistance such as when pushing on something that is heavy or substantially immovable, like a large pile of earth. When the machine meets the resistance of the large pile of earth, the forward travel of the machine may be slowed or stopped, which, in turn, slows or stops the hydraulic motor that drives the drive mechanism. This substantially inhibits the flow of fluid through the motor. However, the variable displacement pump may continue to pump fluid to the hydraulic motor resulting in a build-up of pressure in the system.

One way to relieve this kind of pressure build up is with a cross-over relief (COR) valve, which may permit hydraulic fluid to flow (i.e., cross over) from the high pressure side of the circuit over to the low pressure side. While a COR valve can prevent spikes in pressure, continued flow across a COR valve can cause significant heating of the hydraulic fluid due to the pressure drop of the fluid as it passes from the high pressure side to the low pressure side of the system. Moreover, flow across a COR can be an inefficient use of energy since the flow through the valve is not productive, that is, not being used in a productive manner, such as, for example to turn the hydraulic motor.

Another common way to provide pressure relief is with an electronic pressure override (EPOR) system. An EPOR system senses system pressure and acts to reduce the displacement of the variable displacement pump, and thus reduce the amount of fluid being pumped to the hydraulic motor (or implement actuator), when the pressure exceeds a certain amount. Many hydraulic systems include EPOR systems in addition to COR valves.

An example of an EPOR system with COR is disclosed in U.S. Pat. No. 6,202,411 (the '411 patent). The '411 patent discloses a system that adjusts the discharge flow rate of a hydraulic pump when the system is held at a predetermined pressure for a predetermined period of time and when a specific operational condition of the system is sensed. Some of the disclosed operational conditions include use of a specific type of work implement, a high revolution condition of the engine and an operator selected work mode.

While effective to reduce pressure in the system, EPOR systems that are based on pressure control can be difficult to tune in a way that yields a consistent, intuitive feel to an operator of the machine. In particular, since the pressure control can be quite sensitive, when the EPOR system activates to reduce the pressure in a system, the pressure can momentarily overshoot and then drop dramatically causing an operator to feel as though the machine has suddenly stopped pushing. Moreover, an EPOR system based on pressure control can be relatively stiff to control and must be set to a pressure that is less than the upper limit of the system meaning that the machine may produce less than its maximum capable performance.

SUMMARY

The disclosure describes, in one aspect, a hydraulic power control system for a machine. The system includes a hydraulic motor and a hydraulic pump configured to supply hydraulic fluid to the hydraulic motor. A relief valve is provided that is configured to release hydraulic fluid from a location between the hydraulic pump and the hydraulic motor when a pressure of the hydraulic fluid exceeds a predetermined relief pressure. Above a predetermined threshold pressure for the system, the displacement of the pump is adjusted to at least a minimum displacement that is based on a total demanded flow for the system that includes a desired flow of hydraulic fluid across the relief valve and a first hydraulic fluid flow consumed by the motor.

In another aspect, the disclosure describes a method of controlling a hydraulic power system for a machine. The method includes the step of determining if a pressure of the hydraulic fluid in the system exceeds a predetermined threshold pressure. Displacement of a hydraulic pump is regulated to at least a minimum displacement that is based on a total demanded flow for the system that includes a desired flow of released hydraulic fluid and a first hydraulic fluid flow consumed by a hydraulic motor when the pressure exceeds the threshold pressure.

BRIEF DESCRIPTION OF THE DRAWINGS

FIG. 4 is a schematic flow diagram illustrating a hydraulic power control method according to the present disclosure.

DETAILED DESCRIPTION

Figure 1:
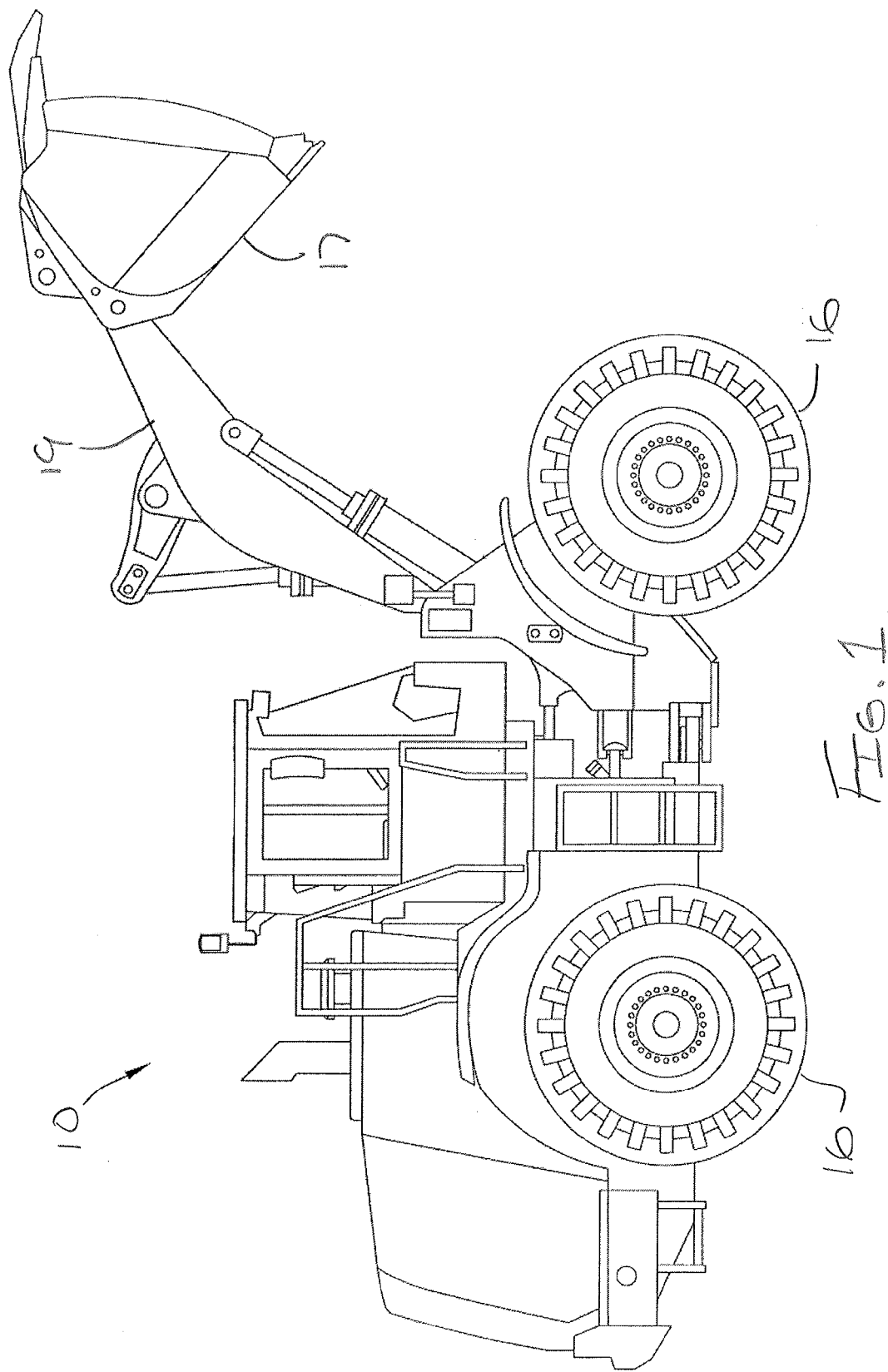
FIG. 1 is a schematic side view of a wheeled machine suitable for use with the apparatus and method according to the present disclosure.
Figure 2:
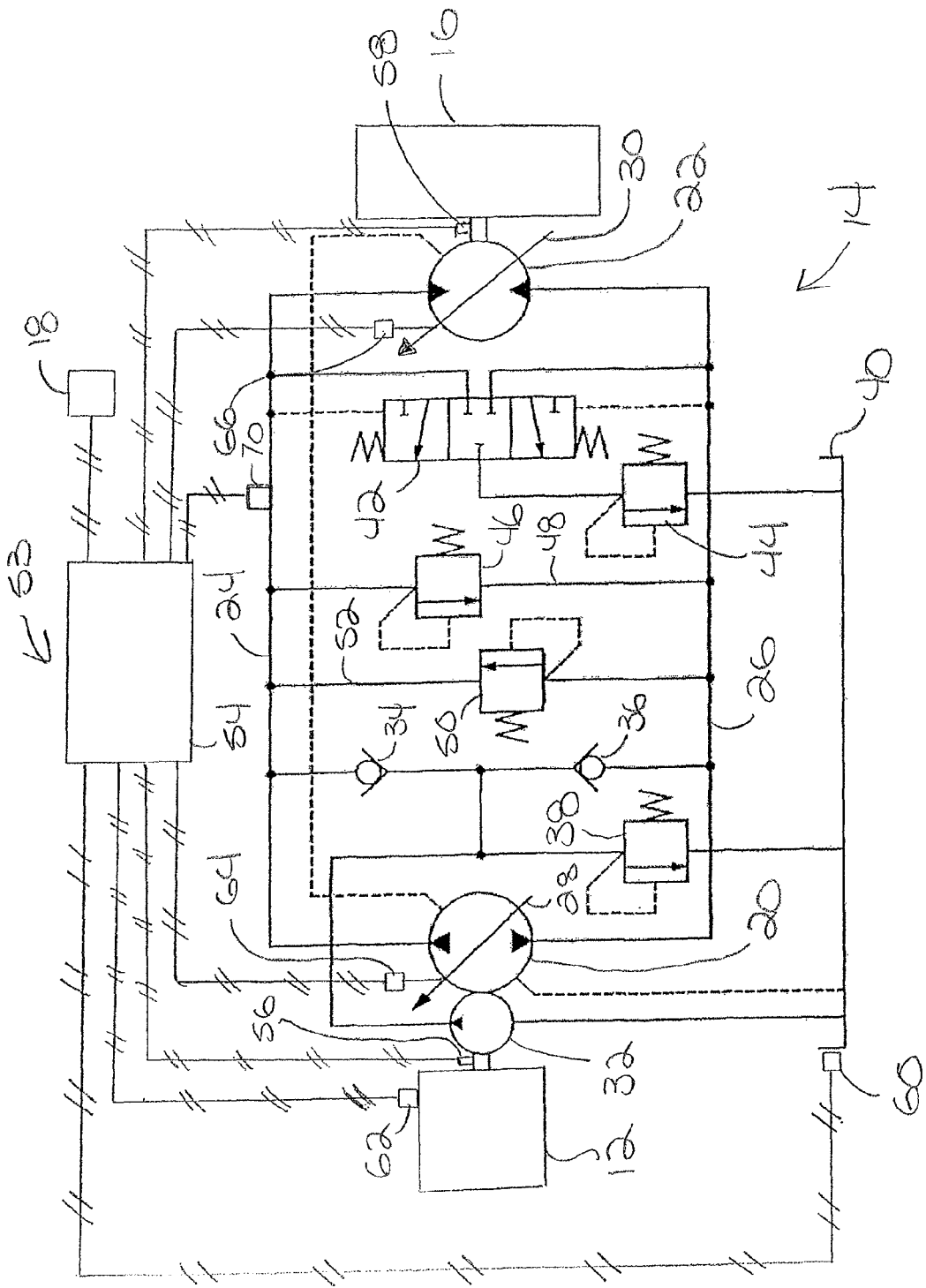
FIG. 2 is a schematic illustration of a hydraulic power system and associated control system according to the present disclosure.

This disclosure relates to an apparatus and method for controlling a hydraulic power system for a machine that may be operable to transmit power to a load associated with the machine. With particular reference to FIGS. 1 and 2, an exemplary machine 10 having a power source 12 and a hydraulic power system 14 (see FIG. 2) that can transmit power from the power source 12 to a load, in this case one or more traction devices 16, that propel the machine in response to an input received via an operator input device 18. In the embodiment of FIG. 1, the traction devices 16 comprise wheels. Alternatively, the traction devices may embody a track located on a side of the machine, a belt, or any other driven traction device. When two drive trains are included within the machine 10, the two associated traction devices 16 may be located on opposing sides of the machine 10 and simultaneously controlled to propel the machine 10 or independently controlled to steer the machine 10.

In addition to transmitting power to the traction devices that propel the machine, the hydraulic power system 14 also may be used to transmit power to other loads such as, for example, an implement that is connected to the machine. In this case, the machine 10 includes a bucket 17 that is supported by a boom 19 (see FIG. 1) that is mounted to the body of the machine. The implements carried by the machine may be utilized for a variety of tasks, including, for example, loading, compacting, lifting, brushing, and include, for example, buckets, compactors, forked lifting devices, brushes, grapples, cutters, shears, blades, breakers/hammers, augers, and others.

While the hydraulic power system 14 is illustrated in connection with a wheel loader, the arrangement disclosed herein has universal applicability in various other types of machines as well. In this regard, the term "machine" may refer to any machine that performs some type of operation associated with an industry such as mining, construction, farming, transportation, or any other industry known in the art. For example, the machine 10 may be an earth-moving machine, such as a wheel loader, track loader, bulldozer, excavator, dump truck, backhoe, motor grader, material handler or the like.

The power source 12 may be configured to produce a power output and may include an internal combustion engine. For example, the power source 12 may include a diesel engine, a gasoline engine, a gaseous fuel-powered engine, or any other type of engine apparent to one skilled in the art. It is contemplated that the power source 12 may alternatively embody a non-combustion source of power such as a fuel cell, a battery, or an electric motor, if desired. The power source 12 may produce a rotational mechanical output received by the hydraulic power system 14.

The operator input device 18 may be located within an operator station of the machine 10, for example, in close proximity to an operator's seat. The operator input device 18 may embody any one of numerous devices that control functions of the machine 10. In one example, the operator input device 18 may embody a joystick controller. It is contemplated, however, that operator input device 18 may embody additional or different control devices such as, for example, pedals, levers, switches, buttons, wheels, and other control devices known in the art. The operator input device 18 may be manipulated to generate signals indicative of a desired output of the hydraulic power system 14 (i.e., a desired travel speed, rimpull torque, and/or travel direction of the machine 10). In one example, a single operator input device 18 may be used to simultaneously control the movement of multiple traction devices 16. In another example, multiple operator input devices 18 may be used to independently control the movement of multiple traction devices 16.

With additional reference to FIG. 2, the hydraulic power system 14 may include a hydraulic pump 20 and a hydraulic motor 22 coupled in a closed loop hydraulic configuration (i.e., the hydraulic power system 18 may be a hydrostatic transmission). The pump 20 may be mechanically driven by the power source 12, while the motor 22 may mechanically drive the traction device 16. A first passageway 24 may direct pressurized fluid discharged from the pump 20 to the motor 22. A second passageway 26 may return used fluid from the motor 22 to the pump 20. It is contemplated that, in some embodiments, the functions of the first and second passageways 24, 26 may be reversed to thereby reverse the travel direction of the traction device 16, if desired.

The pump 20 may be a swashplate-type pump and include multiple piston bores, and pistons held against a tiltable swashplate 28. The pistons may reciprocate within the piston bores to produce a pumping action as the swashplate 28 rotates relative to the pistons. The swashplate 28 may be selectively tilted relative to a longitudinal axis of the pistons to vary a displacement of the pistons within their respective bores. The angular setting of the swashplate 28 relative to the pistons may be carried out by any actuator known in the art, for example, by a servo motor. Although shown in FIG. 1 as producing only a unidirectional flow of pressurized fluid, it is contemplated that the pump 20 may be an over-center type pump or rotatable in opposing directions to produce flows of fluid in opposing directions, if desired.

The motor 22 may be a fixed or variable displacement type motor fluidly coupled to the pump 20. The motor 22 may convert the pressurized fluid from pump 20 into a rotational output of traction device 16. As a variable displacement motor, the motor 22 may include multiple piston bores and pistons (not shown) held against a fixed or rotatable swashplate 30. The angle of the swashplate 30 may determine an effective displacement of the pistons relative to the bores of the motor 22. The angular setting of the swashplate 30 relative to the pistons may be carried out by any actuator known in the art, for example, by a servo motor.

The hydraulic power system 14 may include a boost circuit associated with the pump that can operate to boost the pressure of the hydraulic fluid that is directed to the input side of the pump 20. As shown in FIG. 2, the boost circuit can include a boost pump 32, check valves 34 and 36 and a boost circuit relief valve 38 that discharges to a sump 40. In a known manner, the boost circuit may interact with a bleeding block to control the low pressure line in the hydraulic power system 14. As noted previously, the low pressure line is typically going to be first passageway 26, which is the return line from the motor 22, however under certain operating conditions, the second passageway 24 may be the low pressure line. In this case, the bleeding block can include a shuttle valve 42 and a bleeding block relief valve 10 that is configured to discharge to the sump 40.

In some situations, it may be possible for the pressure of the fluid discharged by the pump 20 to exceed an acceptable threshold value. If unaccounted for, these high pressures could result in damage to the hydraulic power system 14. As shown in FIG. 2, in order to help minimize damage and ensure predictable operation of the machine 10, a first cross-over pressure relief valve 46 may be situated to selectively direct pressurized fluid from the pump 20 to bypass the motor 22 (i.e., to direct fluid from the high pressure first passageway 24 to the low pressure second passageway 26, without the fluid passing through the motor 22) via a first bypass passageway 48. Additionally, to account for situations in which the second fluid passageway 26 is the high pressure side of the hydraulic system (e.g., when the system is operating in reverse), a second cross-over pressure relief valve 50 may be provided that is situated to selectively direct pressurized fluid from the second fluid passageway 26 to the lower pressure first passageway 24 via a second bypass passageway 52.

Although illustrated as pilot operated, spring biased, valve mechanisms, it is contemplated that the cross-over pressure relief valves 46, 50 could alternatively embody an electronic valve actuated in response to a measured pressure, if desired. Additionally, the pressure limit of the pressure relief valves may be variable, and may also be adjustable.

A control system 53 including a controller 54 with associated sensors may be provided to facilitate operation of the hydraulic power system 14. As schematically shown in FIG. 2, the controller 54 may be in communication with the operator input device 18, the pump 20, the motor 22, a pump speed sensor 56, a motor speed sensor 58, a hydraulic fluid temperature sensor 60 and a power source speed sensor 62. The temperature sensor 60 may be configured to monitor temperature of hydraulic fluid and may be located anywhere within the hydraulic circuit. For example, the temperature sensor 60 may be configured to monitor the temperature of the hydraulic fluid within the sump 40, as shown in FIG. 2.

The controller 54 may be further configured to generate control signals for regulating operation of the pump 20 and the motor 22. More particularly, the controller 54 may be configured to control displacement of the pump 20 and the motor 22 by, for example, controlling a pump actuator device 64 (e.g., a solenoid and spool valve) to vary the displacement of the pump 20. Additionally, the pump actuator device 64 may provide information to the controller about actual or commanded displacement of the pump 20. Similarly, the displacement of the motor 22 may also be controlled by a motor actuator device 66. The motor actuator device 66 may also provide information to the controller about actual or commanded displacement of the motor 22. The controller 54 may control displacement of the pump 20 and motor 22 based on information received from the operator input device 18 and the various sensors. The controller 54 may be in communication with the operator input device 18, pump 20, motor 22 and sensors via control lines, which may carry digital, analog, or mixed types of signals. Alternatively, communication with the various components may be implemented by mechanical or hydraulic lines.

The controller 54 may embody a single microprocessor or multiple microprocessors. Numerous commercially available microprocessors may be configured to perform the functions of the controller 54. It should be appreciated that the controller 54 may readily embody a general machine microprocessor capable of controlling numerous machine functions. Various other circuits may be associated with the controller 54, such as power supply circuitry, signal conditioning circuitry, data acquisition circuitry, signal output circuitry, signal amplification circuitry, and other types of circuitry known in the art.

In addition to the cross-over relief valves 46, 50, the system may also be equipped with an electronic pressure override (EPOR) control. The EPOR may be implemented by the controller 54 and be operable to reduce the displacement of the pump 20 and/or increase displacement of the motor 22 to reduce pressure in the system when a pressure sensor 70 (see FIG. 2) associated with the system measures a pressure above a predetermined limit. The predetermined limit at which the EPOR system activates may be variable or adjustable. The amount of change to the displacements of the pump 20 and/or motor 22 (i.e., the amount the actual gear ratio is reduced from the operator desired gear ratio) may be known as the EPOR factor. The pressure sensor 70 may be arranged at any point in the hydraulic system between the pump 20 and the motor 22.

Figure 3:
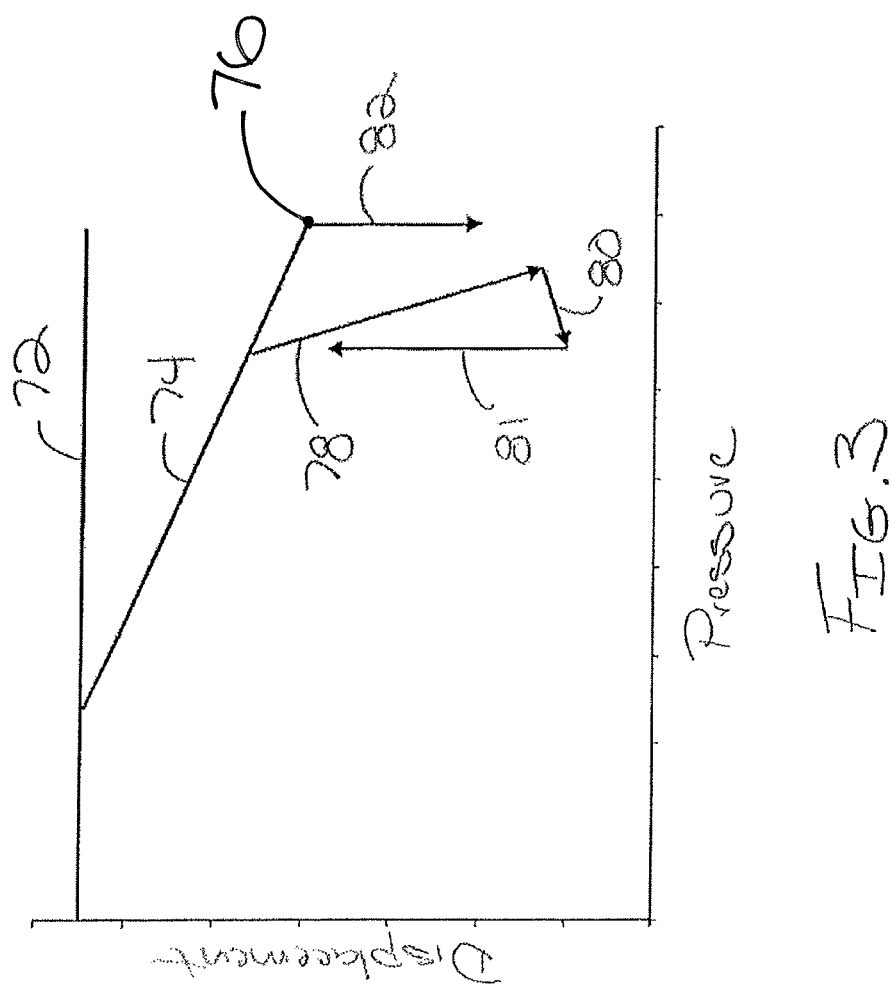
FIG. 3 is a simplified exemplary plot of system pressure on the x-axis and pump displacement on the y-axis that illustrates a potential impact of the hydraulic power system and associated control according to the present disclosure as compared to a pressure based control strategy.

Under certain operating conditions, an EPOR control may provide a less than ideal feel to an operator of the machine 10. In particular, operator feedback when trying to recover from a machine stall condition can be problematic with an EPOR control system. For example, FIG. 3 provides an exemplary plot of system pressure on the x-axis and pump displacement on the y-axis that illustrates the operation of the cross-over pressure relief valves 46, 50 and the EPOR control. In FIG. 3, line 72 represents the theoretical pump capability and line 74 represents the actual pump capability as limited by the power of the power source 12. As load drives the system pressure higher, the pump displacement is first determined by the power limit of the power source 12. Point 76 represents the mechanical operation of the cross-over pressure relief valves 46, 50. The cross-over pressure relief valves 46, 50 operate to maintain the system pressure once it reaches the predetermined relief pressure setting of the valves. Thereafter, without an additional control there would be no decrease in pump 20 displacement as pressure will be maintained by the cross-over pressure relief valves.

Line 78 in FIG. 3 represents operation of the EPOR control. As shown in FIG. 3, at a pressure that, in this case, is near but below the relief pressure setting of the cross-over relief valves 46, 50, the EPOR system activates. As shown, dynamically and momentarily, the system pressure continues to rise and exceeds the pressure at which the EPOR system activates. However, after a few seconds, as the controller 54 decreases displacement of the pump 20, the pressure will drop down to the level at which the EPOR control was initially activated. This drop in pressure is represented by segment 80 of line 78. Line segment 81 represents how displacement of the pump 20 is then increased by the EPOR control. As shown by FIG. 3, the EPOR control allows the machine to operate at a higher pressure at some points than at others. When the operating pressure of the system drops, it can give an operator the feel that the machine suddenly quits pushing. Additionally, the EPOR control does not allow the system to operate near or at the maximum pressure limit of the system. Thus, less torque may be available to an operator of the machine. Also, in a stall condition, the pressure limitation imposed by the EPOR control can require a significant decrease in machine load in order to start increasing the pump displacement as the pressure may not be maintained uniformly as suggested by line 81. That, combined with poor hydraulic motor efficiency at zero speed can make recovery from a stall condition difficult.

The hydraulic power system 14 may be able to tolerate at least some flow through the cross-over relief valves 46, 50 under at least some operating conditions and for at least some period of time. Accordingly, in such circumstances, it may be possible to regulate displacement of the pump based on a total demanded flow for the system according to the present disclosure rather than based solely on pressure. Controlling based on total demanded flow can provide improved performance as compared to a solely pressure based control particularly at high load conditions for the machine. More specifically, under high load conditions, controlling based on total flow can permit the system to operate nearer to the highest pressure mechanically allowed by the system thereby increasing the torque available to an operator of the machine. Controlling based on total flow under high load conditions can also improve the transient response of the machine because the control monitors pump flow demanded by the motor and proactively increases pump displacement for demand. Since the total demanded flow based control may only be activated under certain operating conditions, for example high load conditions, it can be used in conjunction with the EPOR control which would be active when the high load conditions are not present.

Referring to FIG. 4 of the drawings, a schematic flow diagram is provided that includes various steps that may be included in the total demanded flow based control system for the hydraulic power system 14 and may be implemented by the controller 54. In an initial step 88, the pressure of the hydraulic fluid in the circuit is determined. This step 88 can be implemented by the controller 54 in conjunction with the pressure sensor 70. Next, the pressure determined in step 88 is compared to a predetermined threshold pressure in step 90. Again, this step 90 can be implemented by the controller 54. The threshold pressure can represent the point at which the control system transitions from a pressure based control to the total demanded flow based control. The threshold pressure may be determined based on what represents a high load condition for the machine 10. For example, the threshold pressure may be approximately 90% of the maximum pressure for the system.

If the system pressure determined in step 88 does not exceed the predetermined threshold pressure as determined in step 90 then the system may regulate displacement of the pump based on pressure of the hydraulic fluid using the EPOR control or commanded or desired motor speed in step 92. The method then cycles back to step 88 and the pressure of the hydraulic fluid in the circuit is again determined.

If the pressure in the circuit does exceed the predetermined threshold pressure in step 90, a further step 94 of the method shown FIG. 4 involves determining a desired flow across the cross-over pressure relief valve 46, 50. Again, this step 94 may be implemented by the controller 54. To this end, the controller 54 may include one or more software maps stored within an internal memory thereof that the controller 54 may reference during operation. Each of the maps may include a collection of data in the form of tables, graphs or equations. The desired level of flow across the cross-over pressure relief valve 46, 50 may be determined in a variety of different ways. For example, continued flow across the cross-over relief valve 46, 50 can cause heating of the hydraulic fluid due to the pressure drop of the fluid as it passes from the high pressure side of the circuit to the low pressure side of the circuit. This build-up of heat may adversely affect operation of the hydraulic power system at some point. Accordingly, the desired amount of flow across the cross-over pressure relief valve 46, 50 may be determined based on a measured temperature of the hydraulic fluid in the sump 40, in this case, via temperature sensor 60. For example, a control map may be provided in the software of the controller 54 based on measurements in a test environment of the sump temperature for a given level of flow across the cross-over pressure relief valve 46, 50. The control map may provide a maximum flow across the cross-over pressure relief valve for a measured sump temperature and from that the controller 54 may select a lower flow across the cross-over relief valve for other reasons such as fuel savings.

Once the desired flow across the cross-over pressure relief valve 46, 50 is determined in step 94, the controller 54 can then determine a total demanded flow for the system in step 96. The total demanded flow can include both the desired flow across the cross-over relief valve 46, 50 from step 96 and the hydraulic fluid flow consumed by the motor 22. In addition, the total demanded flow can include losses in the circuit as a result of leakage. For example, leakage in the circuit may be generated by clearances between pistons and bore of the pump 20 and motor 22 and of any associated valves. Leakage in the circuit may be based on an actual measurement or an estimate that takes into account how leakage can vary depending upon pressure in the circuit.

Next, in step 98, the system can regulate displacement of the pump 20 to at least a minimum displacement based on the total demanded flow determined in step 98. In this sense, the system can be considered to be providing a floor below which the displacement of pump 20 will not be set. Moreover, because it is based on total demanded flow for the system, the floor can be considered to float in the sense that the minimum displacement will rise as more flow is consumed by the motor 22. Thus, stall recovery can be improved as compared to an EPOR control because rather than wait for pressure to begin to drop before increasing pump displacement, the system can increase pump displacement immediately to compensate for flow usage by the motor 22. In this regard, with reference to FIG. 3, the operation of the total demanded flow based control system in terms of pressure vs. displacement is shown by vertical line 82. There may be operating conditions under which the controller 54 would select a pump displacement that is different than the floor determined based on total demanded flow. For example, if the power source 12 is not capable of providing the power that may be needed to sustain the displacement floor based on the total demanded flow then the displacement may be reduced by the controller 54 to level at which the engine will not stall.

The final step 100 in FIG. 4 involves releasing hydraulic fluid at a location between the pump 20 and the motor 22 when the pressure of the hydraulic fluid exceeds a predetermined relief pressure. In the hydraulic power system 14 illustrated in FIG. 2, the releasing is performed by the cross-over pressure relief valves 46 or 50 and the released hydraulic fluid is directed from the high pressure side of the side of the hydraulic circuit to the low pressure side of the hydraulic circuit via either the first or second fluid bypass passageways 48 or 52.

INDUSTRIAL APPLICABILITY

The hydraulic power control system and method described herein may be implemented in a variety of different machines that utilize hydrostatic transmissions to power movement of the machine or operation of an implement that is connected to the machine. The disclosed control system and method may be particularly suitable to applications in which, under at least some operating conditions, some amount of flow over a cross-over relief valve can be maintained without excessive heating of the hydraulic fluid in the system.

As compared to control systems that operate based solely on pressure of the hydraulic fluid in the system, the disclosed control system and method based on flow across the cross-over relief valve or non-productive flow may provide a more consistent feel to an operator of the machine because at high load conditions it is not subject to the overshooting issues associated with pressure based control systems that may make an operator feel as if the machine has suddenly stopped pushing. Moreover, as compared to solely pressure based control systems, a control scheme based on flow across the cross-over pressure relief valve may allow the hydraulic power system to operate more closely to its maximum allowable pressure, thereby increasing the available torque. Also, because it can monitor the amount of flow being consumed by the motor and proactively increase the pump displacement based on demand, the system can provide improved machine transient response particularly at or near a stall condition.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A hydraulic power control system for a machine comprising:
    a hydraulic motor;
    a variable displacement hydraulic pump configured to supply hydraulic fluid to the hydraulic motor;
    a relief valve configured to release hydraulic fluid from a location between the hydraulic pump and the hydraulic motor when a pressure of the hydraulic fluid exceeds a predetermined relief pressure; and
    wherein above a predetermined threshold pressure of the hydraulic fluid a total demanded flow for the system is determined based on a determination of a desired flow of hydraulic fluid across the relief valve and a determination of a first hydraulic fluid flow being consumed by the motor and the displacement of the pump is adjusted to at least a minimum displacement that is based on the total demanded flow for the system.

2. The system of claim 1 wherein the desired flow across the relief valve is based on a temperature of the hydraulic fluid.

3. The system of claim 1 wherein the determination of the total demanded flow includes a determination of a leakage flow for the system.

4. The system of claim 1 wherein the predetermined threshold pressure is approximately 90% of a maximum pressure for the system.

5. The system of claim 1 further including a pressure sensor for determining a pressure of the hydraulic fluid in the system between the hydraulic pump and the hydraulic motor.

6. The system of claim 1 wherein up to the predetermined threshold pressure for the system, the displacement of the pump is regulated based on a pressure of the hydraulic fluid.

7. The system of claim 1 wherein up to a predetermined threshold pressure for the system, the displacement of the pump is regulated based on a desired speed of the hydraulic motor.

8. A method of controlling a hydraulic power system for a machine comprising:
    determining if a pressure of the hydraulic fluid in the system exceeds a predetermined threshold pressure;
    determining a total demanded flow for the system including determining a desired flow of released hydraulic fluid and determining a first hydraulic fluid flow being consumed by a hydraulic motor;
    regulating displacement of a hydraulic pump to at least a minimum displacement that is based on the total demanded flow for the system when the pressure exceeds the threshold pressure; and
    releasing hydraulic fluid from a location between the hydraulic pump and the hydraulic motor when the pressure of the hydraulic fluid exceeds a predetermined relief pressure.

9. The method of claim 8 wherein the desired released flow is determined based on a temperature of the hydraulic fluid.

10. The method of claim 8 wherein determining the total demanded flow includes determining a leakage flow for the system.

11. The method of claim 8 wherein the threshold pressure is approximately 90% of a maximum pressure for the system.

12. The method of claim 8 further including the step of determining a pressure of the hydraulic fluid in the system between the hydraulic pump and the hydraulic motor.

13. The method of claim 8 further including the step of regulating displacement of the hydraulic pump based on the pressure of the hydraulic fluid when the pressure is less than the threshold pressure.

14. The method of claim 8 further including the step of regulating displacement of the hydraulic pump based on a desired speed of the hydraulic motor when the pressure is less than the threshold pressure.

15. A machine comprising:
    a load;
    a power source;
    a hydraulic motor operatively connected to the load;
    a hydraulic pump operatively connected to the power source and configured to supply hydraulic fluid to the hydraulic motor;
    a relief valve configured to release hydraulic fluid from a location between the hydraulic pump and the hydraulic motor when a pressure of the hydraulic fluid exceeds a predetermined relief pressure; and
    a controller in communication with the hydraulic motor and the hydraulic pump, the controller being configured to determine if a pressure of the hydraulic fluid exceeds a predetermined threshold pressure, to determine a total demanded flow for the system that includes a determination of a desired flow hydraulic fluid across the relief valve and a determination of a first hydraulic fluid flow being consumed by the motor when the pressure of the hydraulic fluid exceeds the predetermined threshold pressure, and to regulate displacement of the hydraulic pump to at least a minimum displacement that is based on the total demanded flow for the system when the pressure in the system exceeds the threshold pressure.

16. The machine of claim 15 wherein the controller determines the desired flow across the relief valve based on a temperature of the hydraulic fluid.

17. The machine of claim 15 wherein determination of the total demanded flow includes a determination of a leakage flow for the system.

18. The machine of claim 15 further including a pressure sensor for determining a pressure of the hydraulic fluid in the system between the hydraulic pump and the hydraulic motor.

19. The machine of claim 15 wherein up to the predetermined threshold pressure for the system, the displacement of the pump is regulated by the controller based on a pressure of the hydraulic fluid.

20. The machine of claim 15 wherein up to a predetermined threshold pressure for the system, the displacement of the pump is regulated by the controller based on a desired speed of the hydraulic motor.

* * * * *